(12) United States Patent
Lane et al.

(10) Patent No.: US 6,340,438 B1
(45) Date of Patent: Jan. 22, 2002

(54) CORROSION INHIBITING ADMIXTURE FOR CONCRETE

(75) Inventors: Donald R. Lane, Richfield; Jose A. Melendez, North Canton; Violeta F. Munteanu, Alliance; Frederick D. Kinney, Broadview Heights, all of OH (US)

(73) Assignee: Tomahawk, Inc., Wilmington, DE (US)

( * ) Notice: Subject to any disclaimer, the term of this patent is extended or adjusted under 35 U.S.C. 154(b) by 0 days.

(21) Appl. No.: 09/295,117

(22) Filed: Apr. 19, 1999

(51) Int. Cl.[7] ............................................. C23F 11/00
(52) U.S. Cl. ...................... 252/387; 252/388; 252/390; 252/394; 148/240; 148/243; 148/248; 148/274; 422/7; 106/14.05; 106/14.11; 106/14.15; 106/14.41; 106/14.42
(58) Field of Search ................... 148/240, 243, 148/248, 274; 252/387, 388, 390, 394; 422/7; 106/14.05, 14.11, 14.15, 14.41, 14.42

(56) References Cited

U.S. PATENT DOCUMENTS

| | | | |
|---|---|---|---|
| 3,801,338 A | * 4/1974 | Whitaker | 106/90 |
| 4,116,706 A | * 9/1978 | Previte | 106/90 |
| 4,285,733 A | 8/1981 | Rosenberg et al. | |
| 4,442,021 A | * 4/1984 | Bürge et al. | 252/389 |
| 4,444,803 A | 4/1984 | Winters et al. | |
| 4,466,834 A | 8/1984 | Dodson et al. | |
| 4,479,981 A | 10/1984 | Winters, et al. | |
| 5,084,103 A | * 1/1992 | Myers et al. | 106/727 |
| 5,181,961 A | * 1/1993 | Umaki et al. | 106/724 |
| 5,306,344 A | 4/1994 | Gutmann et al. | |
| 5,422,141 A | 6/1995 | Hoops et al. | |
| 5,427,819 A | * 6/1995 | Weyers et al. | 427/136 |
| 5,527,388 A | * 6/1996 | Berke et al. | 106/819 |
| 5,531,937 A | 7/1996 | Minevski et al. | |
| 5,597,514 A | 1/1997 | Miksic et al. | |
| 5,840,114 A | * 11/1998 | Jeknavorian et al. | 106/802 |
| 5,916,483 A | * 6/1999 | Bürge et al. | 252/390 |

* cited by examiner

Primary Examiner—Jill Warden
Assistant Examiner—Monique T. Cole
(74) Attorney, Agent, or Firm—James A. Hudak

(57) ABSTRACT

A corrosion inhibiting admixture for concrete is disclosed comprising a combination of organic (amines) and inorganic (nitrites) fractions that provide a synergistic effect when present at a specific ratio. Such a synergistic effect occurs when the amine:nitrite ratio (% by weight) is between 1.5 to 2.5 resulting in the admixture providing excellent corrosion inhibiting capabilities.

8 Claims, 4 Drawing Sheets

CORROSION INHIBITING ADMIXTURE FOR CONCRETE

TECHNICAL FIELD

The present invention relates, in general, to a corrosion inhibitor for concrete having steel reinforcing rods (rebar) therein and, more particularly, to an admixture which can be mixed with the concrete when in the plastic state and which prevents corrosion of the steel reinforcing rods over an extended period of time when the concrete is exposed to chloride ion environments.

BACKGROUND ART

Reinforced concrete structures, such as highways, bridges, parking garages, and the like are very susceptible to corrosion from common chloride deicing salts which are applied to their respective surfaces and which cause corrosion of the steel reinforcing rods (rebar) which are an integral part of their structure. Similarly, reinforced concrete structures which are exposed to aggressive marine environments, such as piers, docks and bridge supports, are also susceptible to corrosion of the reinforcing rods therein. In either case, such corrosion is usually caused by chloride ions that penetrate through the surface of the concrete and contact the reinforcing rods. The electrochemical process by which corrosion of the reinforcing rods and rod degradation occurs is well known.

Under highly alkaline conditions, such as that which exists in Portland cement concrete, an oxidized film forms on the steel reinforcing rods inhibiting the corrosion of the rods. (The steel rods are said to have become "passivated.") However, when chloride ions are allowed to penetrate into the concrete and reach the reinforcing rods, the first phase of the corrosion process (the initiation phase) commences. In this phase, there is no noticeable weakening of the concrete structure, but carbonation and chloride ion penetration occurs. Carbonation reduces the pH of the concrete, thus reducing the corrosion protection usually provided to the reinforcing rods by the alkaline concrete. Eventually, the passivity of the steel reinforcing rods breaks down as the oxidized film on the rods is broken and decays. Such breakage of the film generally occurs locally exposing the steel rods. As the oxidized film decays, the electrical resistance of the steel rods, i.e., the property that prevents the surface of the steel rods from polarizing and forming anodes and cathodes, is compromised. As a result, the small exposed portion of a steel rod acts as an anode, and the larger unexposed portion of the rod, still covered by the oxidized film, acts as a cathode resulting in the creation of a potential difference between the anode and the cathode. When the potential difference between the anode and the cathode is great enough, the steel reinforcing rod begins to corrode, i.e., metal ions are removed from the rod at its anode. As a result, corrosion takes place in spots (pitting) along the surface of the steel reinforcing rod resulting in the commencement of the second phase of the corrosion process (the propagation phase).

During the propagation phase, the effective sectional area of the steel reinforcing rod is progressively reduced by the corrosion causing a significant reduction in the strength of the rod. As the number of corrosion spots (pits) increases, they interconnect with one another spreading over the entire surface of the steel rod. In the initial stages of corrosion, ferrous hydroxide is formed which immediately oxidizes into iron oxides which are the main components of rust. In the course of the rust formation, the corroding rod expands at the point of rust formation. The localized expansion of the steel reinforcing rod caused by the formation of rust results in a high expansion pressure being applied to the concrete surrounding the expanded portion of the rod causing cracks to develop in the concrete along the surface of the rod. As the cracks develop in the concrete, additional chloride ions are permitted to contact the steel reinforcing rods, accelerating the corrosion of same and the spalling of the concrete surface. If corrosion and spalling are permitted to continue, the steel reinforcing rods, as well as the surrounding concrete, deteriorate to the point where the structural integrity of the concrete structure may be jeopardized. In order to remedy this condition, the removal and replacement of a substantially large area of concrete is required which is a very costly process.

Several approaches have been taken to repair concrete structures which have undergone or are susceptible to corrosion deterioration of the steel reinforcing rods therein. For example, severely deteriorated concrete can be removed and an overlay applied to the deteriorated structure. Large areas of chloride contaminated concrete, however, will remain in place, and although the corrosion and deterioration process will be slowed, the corrosion process continues. Alternatively, scarification of the top portion of concrete, e.g. on a bridge deck, can be utilized to remove a major portion of the chloride contaminated concrete permitting the application of a corrosion inhibiting agent to the concrete surrounding the steel reinforcing rods. After a corrosion inhibiting agent has been applied to the surrounding concrete, a new concrete overlay is formed thereon. A preferred rehabilitative technique requires complete removal of the concrete surrounding the steel reinforcing rods prior to the application of a new overlay.

Until now the corrosion inhibiting admixtures that have been developed for mixing with concrete when in the plastic state have been limited in their ability to delay the onset of corrosion in the steel reinforcing rods within the concrete, i.e., the initiation phase of corrosion, or to slow such corrosion after it has started, i.e., the propagation phase of corrosion. In view of the foregoing, it has become desirable to develop an admixture that can be mixed with the concrete when in the plastic state and which significantly delays the onset of corrosion in the steel reinforcing rods within the concrete and slows such corrosion after it has commenced even when the concrete is exposed to chloride ion environments. It is also desirable for such an admixture to protect the reinforcing rods in concrete that has partially or completely carbonated reducing the pH of the concrete and accelerating the onset of the protective oxide film deterioration in a chloride containing environment. Ideally, the admixture would also maintain and preferably increase the pH of the concrete.

SUMMARY OF THE INVENTION

The present invention solves the problems associated with the prior art approaches to minimizing corrosion of steel reinforcing rods in concrete as well as other problems by providing a unique corrosion inhibiting admixture comprising a combination of organic (on the basis of amine) and inorganic (on the basis of nitrite) fractions that provide a synergistic effect when present in a specific ratio. The range of the optimal amine:nitrite ratio (% by weight) is between 1.5 to 2.5. The admixture is introduced into concrete when in the plastic state by placing same in the mix water during the batching process or at the construction site. The admixture is thoroughly distributed throughout the concrete to provide substantially uniform levels of corrosion protection within the concrete. In an alternate embodiment of the present invention, a portion of the nitrite is replaced with lithium nitrite to minimize any undesirable alkali-silica reactions in the concrete. It has been found that the introduction of either embodiment of the aforementioned admixture into concrete when in the plastic state significantly delays the onset of corrosion of the steel reinforcing rods within the concrete and slows such corrosion after it has commenced even when the concrete is exposed to aggressive, salt-bearing environments. In addition, the admixture increases the pH of concrete which has carbonated.

DESCRIPTION OF THE PREFERRED EMBODIMENT

Figure 1:
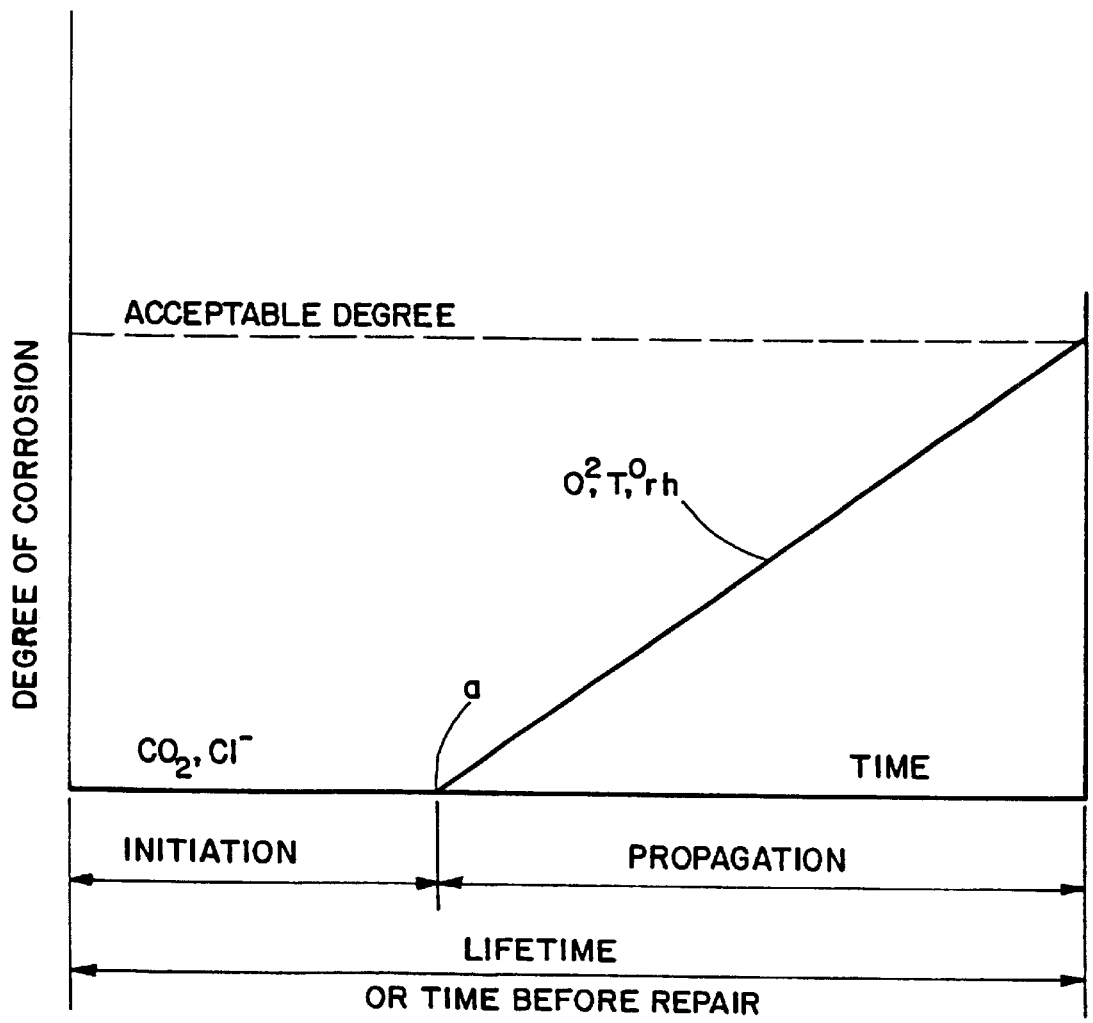
FIG. 1 is a graph of the degree (amount) of corrosion in reinforced concrete versus time for the technical service life of reinforced concrete.

The present invention is directed to a corrosion inhibiting admixture which can be introduced into concrete when in the plastic state by placing the admixture in the mix water during the batching process or at the construction site. Corrosion inhibiting admixtures are presently available, however, their effectiveness in preventing or minimizing corrosion and degradation of reinforcing rods within the concrete is somewhat limited. Through electrochemical testing it has been found that an admixture comprised of organic amines, inorganic nitrites, gluconate and water provides excellent corrosion inhibiting capabilities. Amines that can be utilized include, but are not limited to, primary, secondary and tertiary amines. Examples of such amines include alkylamines, alkanolamines, alkyletheramines, mixtures of amines and alkanolamines, and mixtures of alkanolamines, tertiamines and alkyletheramines. Nitrites that can be utilized include alkali and alkaline earth metals such as sodium nitrite, lithium nitrite, calcium nitrite and potassium nitrite. Similarly, through electrochemical testing, it has been found that the amine:nitrite ratio (percentage by weight) has a synergistic effect on the corrosion inhibiting capabilities of the admixture. In the aforementioned admixture, the range of the optimal amine:nitrite ratio (% by weight) is between 1.5 to 2.5. In this admixture the amines comprise about 20% to 40% by weight of the admixture and the nitrites comprise about 15 to 30% by weight of the admixture.

Tests were conducted comparing concrete containing the aforementioned corrosion inhibiting admixture against concrete without the admixture. For example, a concrete mix comprised of 19.15 pounds of cement, 49.66 pounds of sand, 64.48 pounds of coarse aggregate and 10.95 pounds of water was prepared for control and comparison purposes. Similarly, a second mix comprised of 19.15 pounds of cement, 49.66 pounds of sand, 64.48 pounds of coarse aggregate, 9.12 pounds of water and 420 milliliters of the aforementioned admixture was prepared. The test results for each of the concrete mixes are shown below:

|  | Plain Concrete | Concrete with Admixture |
| --- | --- | --- |
| Slump | 3.75 | 4.00 |
| Percentage Air | 6.4 | 7.2 |
| Compressive Strength (1 day) | 1528 psi | 2116 psi |
| Compressive Strength (4 days) | 3251 psi | 3919 psi |
| Compressive Strength (7 days) | 4077 psi | 4230 psi |
| Compressive Strength (28 days) | 4869 psi | 5002 psi |

In another test, a concrete mix comprised of 517 pounds of concrete, 1330 pounds of sand, 1741 pounds of coarse aggregate and 268 pounds of water was prepared for control and comparison purposes. Similarly, a second mix comprised of 517 pounds of concrete, 1330 pounds of sand, 1741 pounds of coarse aggregate, 232 pounds of water and 3 gallons of the aforementioned admixture was prepared. The test results of the concrete mixes are shown below:

|  | Plain Concrete | Concrete with Admixture |
| --- | --- | --- |
| Slump | 6.25 | 5.25 |
| Percentage Air | 8.0 | 7.4 |
| Compressive Strength (1 day) | 1551 psi | 2638 psi |
| Compressive Strength (3 days) | 3179 psi | 3653 psi |
| Compressive Strength (7 days) | 3894 psi | 4122 psi |
| Compressive Strength (28 days) | 4899 psi | 5020 psi |

As can be seen from the test results, the addition of the aforementioned corrosion inhibiting admixture to concrete when in the plastic state does not adversely affect the physical properties of the resulting "set" concrete since the slump, percentage air entrained and compressive strengths are virtually unaffected by the addition of the admixture.

It has been found that the addition of the aforementioned corrosion inhibiting admixture to concrete significantly increases the amount of time that elapses before the start of corrosion in the concrete, i.e., it significantly delays the onset of the corrosion initiation phase. In addition, the addition of the aforementioned corrosion inhibiting admixture to concrete significantly reduces the rate of corrosion in the concrete after corrosion has commenced, i.e., it significantly increases the time of the corrosion propagation phase. Thus, the addition of the aforementioned corrosion inhibiting admixture to concrete provides a two-fold benefit. The foregoing corrosion process phases are shown graphically in FIG. 1 which is a graph of the degree (amount) of corrosion in reinforced concrete versus time for the technical service life of reinforced concrete and is the accepted model in the industry of the corrosion phenomena in reinforced concrete due to the chloride ion environment and carbonation. During the corrosion initiation phase, which is affected by the amount of atmospheric carbon dioxide and chloride ions to which the concrete is subjected, any corrosion is minimal and there is no noticeable weakening of the concrete structure. When corrosion or rust starts to form, i.e., at point "a" on the graph, the rate of corrosion is affected by the level of oxygen within the surrounding air and the temperature and relative humidity of the surrounding air. The addition of the corrosion inhibiting admixture of the present invention significantly moves point "a" to the right, i.e., it increases the amount of time that elapses before corrosion commences, and also decreases the slope of the line to the right of point "a", i.e., it reduces the rate of corrosion with respect to time after corrosion commences. It has been found experimentally that the addition of the corrosion inhibiting admixture of the present invention to concrete increases the time of the corrosion initiation phase by a factor of about 1.7 to 2.7 versus the time for same if the admixture was not utilized. It has also been found experimentally that the addition of the corrosion inhibiting admixture of the present invention to concrete decreases the corrosion rate of the steel reinforcing rods within same to about $7 \times 10^{-4}$ mm/year. This extremely low corrosion rate, in effect, places the steel reinforcing rods in a passive state resulting in a technical service life of the reinforced concrete of between 90 to 100 years.

Figure 2:
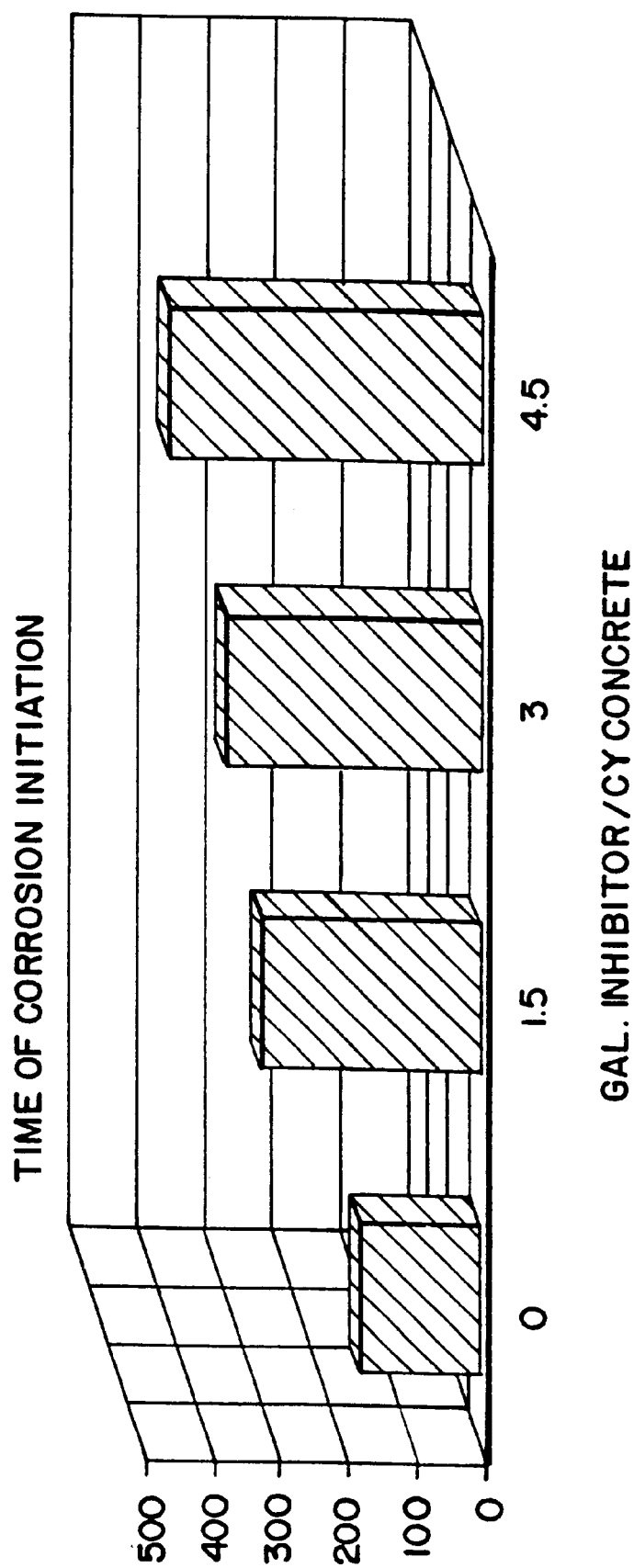
FIG. 2 is a graph of corrosion initiation time versus the amount of corrosion inhibiting admixture added to concrete.
Figure 3:
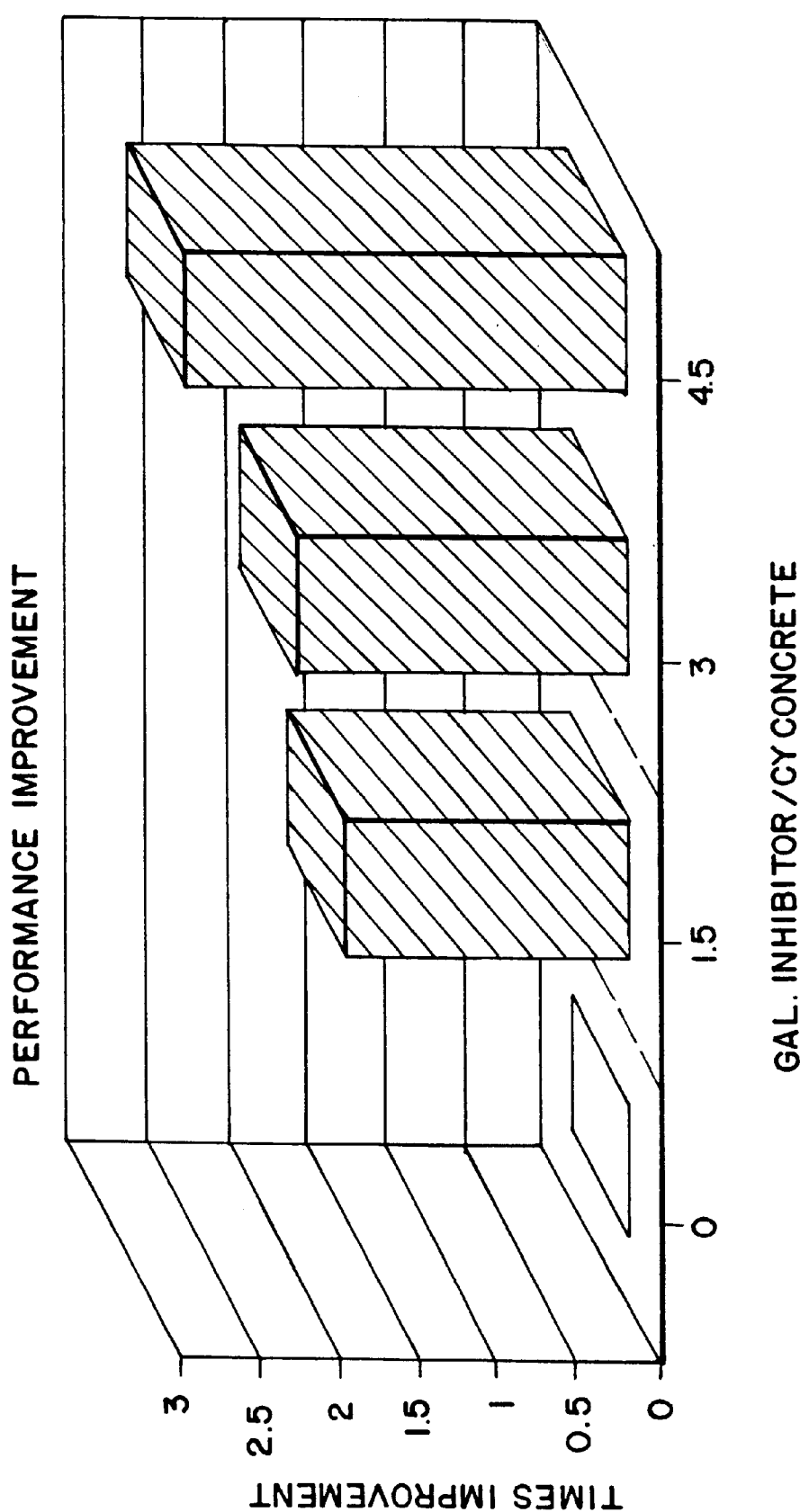
FIG. 3 is a graph illustrating performance improvement (increase in corrosion initiation time) versus the amount of corrosion inhibiting admixture added to concrete.

It has also been found that the amount of corrosion inhibiting admixture added to the concrete has a significant effect on the corrosion inhibiting properties of the resulting mix. For example, referring to FIG. 2, if no admixture is added to the concrete, the corrosion initiation time is significantly less than 200 days. If, however, 1.5 gallons of the corrosion inhibiting admixture is added to each cubic yard of concrete, the corrosion initiation time increases to more than 200 days. Similarly, if 3 gallons of the corrosion inhibiting admixture is added to each cubic yard of concrete, the corrosion initiation time increases to almost 300 days, and if 4.5 gallons of the admixture is added to each cubic yard of concrete, the corrosion initiation time increases to almost 400 days. The performance improvement through increasing the amount of admixture to the concrete, i.e., increase in corrosion initiation time, is shown graphically in FIG. 3.

Figure 4:
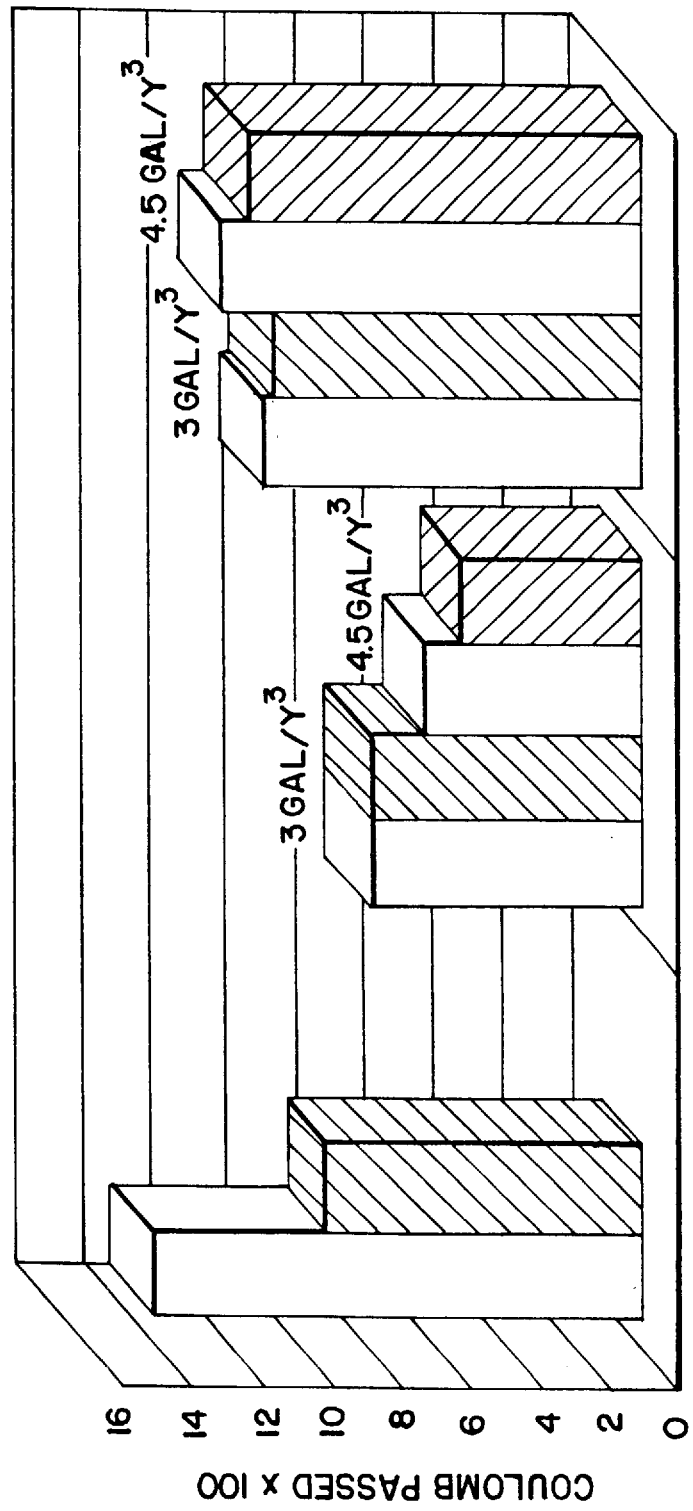
FIG. 4 is a graph comparing the permeability of plain concrete, concrete to which the corrosion inhibiting admixture of the present invention has been added there to, and concrete to which a competitor's corrosion inhibiting admixture has been added thereto.

These significant increases in corrosion initiation time as a result of the addition of the corrosion inhibiting admixture of the present invention to concrete can, in part, be attributed to the fact that the admixture also increases the density of the "set" concrete, thus decreasing its permeability to chloride ion penetration. Such permeability is shown graphically in FIG. 4 which illustrates the permeability of plain concrete, i.e., concrete without any corrosion inhibiting admixture added thereto, after 7 and 28 days versus concrete with the corrosion inhibiting admixture of the present invention added thereto in two concentrations (3 gallons/yd.$^3$ and 4.5 gallons/yd.$^3$) and after 7 and 28 days and versus concrete having W.R. Grace & Company's DCI corrosion inhibiting admixture added thereto in the same concentrations and for the same time periods. By reviewing the foregoing graphs, it is apparent that the addition of the corrosion inhibiting admixture of the present invention to concrete significantly decreases the permeability of the concrete to chloride ion penetration, thus significantly increasing the technical service life of the concrete. It is also apparent that by increasing the amount of admixture to the concrete, the permeability of the concrete to chloride ion penetration is further decreased thus increasing the corrosion initiation time.

In essence, the corrosion inhibiting admixture of the present invention is a significant improvement over presently available corrosion inhibiting admixtures since it is a complex anodic-cathodic, organic-inorganic inhibitor that can protect the steel reinforcing rods in concrete that has developed cracks or has become carbonated to the depth of the reinforcing rods. Presently available corrosion inhibiting admixtures utilize only inorganic anodic inhibitors based on nitrites. When a crack forms in concrete or the concrete cover over the reinforcing rods carbonates, oxygen is allowed to contact the reinforcing rods and the pH environment is lowered to below that necessary to promote a high polarization resistance of the rod surface and maintain a high passive state. When reinforcing rods in concrete containing only anodic inhibitors are exposed to increased oxygen concentrations by the formation of a crack or the surrounding concrete has become carbonated, a nitrite based anodic inhibitor actually causes the passive oxide layer to decay more rapidly than if the anodic inhibitor was not present. In this environment, the anodic inhibitor can actually accelerate the corrosion process. The complex anodic-cathodic, organic-inorganic inhibitor of the present invention blocks access of oxygen to the surface of the steel reinforcing rods and maintains an elevated pH that is necessary to maintain the stability of the passive oxide layer on the reinforced rods even in carbonated concrete contaminated with chloride ions.

Concrete typically contains alkali materials which may be present in the cement, aggregate, and admixtures. In addition, silica compounds are typically found in the aggregate components of concrete. Silica is subject to attack and dissolution by hydroxide ions present in alkaline materials. Different forms of silica show varying degrees of susceptibility to such dissolution. If there are sufficient alkali metal ions present, the alkali metal ions may react with the reactive forms of silica causing the aggregate particles containing the silica to swell and form an alkali-silica gel which can absorb water and swell. Such swelling can exert internal pressures within the concrete causing the concrete to crack. This process is referred to in the industry as an alkali-silica reaction (ASR). This reaction can decrease the ability of the concrete to withstand other forms of attack, such as from the chloride ions within deicing salts, resulting in increased penetration of the chloride ions into the concrete allowing these ions to contact the reinforcing rods therein. Thus, an alkali-silica reaction can significantly increase the degree of corrosion of the reinforcing rods within the concrete. In order to minimize the effect of this reaction on the reinforcing rods within the concrete, a portion of the nitrite within the aforementioned admixture may be replaced with lithium nitrite.

Certain improvements and modifications will occur to those skilled in the act upon reading the foregoing. It should be understood that all such modifications and improvements have been deleted herein for the sake of conciseness and readability, but are properly within the scope of the following claims.

We claim:

1. A corrosion inhibiting admixture to be added to concrete when in the plastic state forming a substantially homogeneous distribution of said admixture within said concrete comprising a combination of amines and nitrites wherein the amine:nitrite ratio (% by weight) is between about 1.5 to 2.5 and wherein said amines comprise about 20% to 40% by weight of said admixture and nitrites comprise about 15% to 30% by weight of said admixture, and further comprising gluconate and water.

2. The corrosion inhibiting admixture as defined in claim 1 wherein said amines comprise primary, secondary or tertiary amines.

3. The corrosion inhibiting admixture as defined in claim 1 wherein the addition of said admixture to concrete having steel reinforcing rods therein increases the time required for the commencement of corrosion on the reinforcing rods by a factor of about 1.7 to 2.7 versus the time for the commencement of corrosion on reinforcing rods in concrete without the addition of a corrosion inhibiting admixture thereto.

4. The corrosion inhibiting admixture as defined in claim 3 wherein increasing the amount of said admixture to concrete having reinforcing rods therein significantly increases the time required for the commencement of corrosion on the reinforcing rods.

5. The corrosion inhibiting admixture as defined in claim 1 wherein the addition of said admixture to concrete having reinforcing rods therein decreases the rate of corrosion of the reinforcing rods, after corrosion has commenced, to about $7 \times 10^{-4}$ mm/year.

6. The corrosion inhibiting admixture as defined in claim 1 wherein the addition of said admixture to concrete decreases the permeability of the concrete to ion penetration.

7. The corrosion inhibiting admixture as defined in claim 1 wherein the addition of said admixture to concrete increases the pH of the concrete minimizing the effects of carbonation of the concrete.

8. The corrosion inhibiting admixture as defined in claim 1 wherein said nitrites comprise alkali and alkaline metal earths.

* * * * *